United States Patent
Van Nieuwenhuyze et al.

(10) Patent No.: US 11,652,512 B2
(45) Date of Patent: May 16, 2023

(54) FAST NFC PROCESSING

(71) Applicants: STMicroelectronics (Rousset) SAS, Rousset (FR); Proton World International N.V., Diegem (BE)

(72) Inventors: Olivier Van Nieuwenhuyze, Wezembeek-Oppem (BE); Alexandre Charles, Auriol (FR)

(73) Assignees: STMicroelectronics (Rousset) SAS, Rousset (FR); Proton World International N.V., Diegem (BE)

( * ) Notice: Subject to any disclaimer, the term of this patent is extended or adjusted under 35 U.S.C. 154(b) by 130 days.

(21) Appl. No.: 17/294,978

(22) PCT Filed: Nov. 28, 2019

(86) PCT No.: PCT/EP2019/082999
§ 371 (c)(1),
(2) Date: May 18, 2021

(87) PCT Pub. No.: WO2020/109518
PCT Pub. Date: Jun. 4, 2020

(65) Prior Publication Data
US 2021/0409074 A1    Dec. 30, 2021

(30) Foreign Application Priority Data
Nov. 30, 2018  (FR) ...................... 1872151

(51) Int. Cl.
*H04W 4/80*    (2018.01)
*H04B 5/00*    (2006.01)
*G06F 9/445*   (2018.01)

(52) U.S. Cl.
CPC ....... *H04B 5/0056* (2013.01); *G06F 9/44505* (2013.01)

(58) Field of Classification Search
CPC combination set(s) only.
See application file for complete search history.

(56) References Cited

U.S. PATENT DOCUMENTS

| 9,992,616 B2 * | 6/2018 | Li ........................ H04W 4/50 |
| 11,301,840 B1 * | 4/2022 | Smith ............... G06Q 20/4012 |
| 2010/0198728 A1 * | 8/2010 | Aabye .................. G06Q 20/40 726/19 |

(Continued)

FOREIGN PATENT DOCUMENTS

| EP | 2498181 A2 | 9/2012 |
| FR | 3037753 A1 | 12/2016 |
| WO | 2009018255 A2 | 2/2009 |

OTHER PUBLICATIONS

Umar, Assad, "Performance Variation in Host-Based Card Emulation Compared to a Hardware Security Element," 2015 First Conference on Mobile and Secure Services (MOBISECSERV), Apr. 2, 2015, 6 pages.

*Primary Examiner* — Cindy Trandai
(74) *Attorney, Agent, or Firm* — Slater Matsil, LLP (57) ABSTRACT

In an embodiment, an NFC controller of an NFC device is configured to transmit, after the detection, by the NFC controller, of an NFC reader in relation with a first NFC transaction and prior to receiving an application selection command from the NFC reader, an application selection message to a transaction handling element of the NFC device.

22 Claims, 3 Drawing Sheets

(56) References Cited

U.S. PATENT DOCUMENTS

| | | | |
|---|---|---|---|
| 2010/0235835 A1* | 9/2010 | Nishiguchi | G06F 9/485 718/1 |
| 2011/0124285 A1* | 5/2011 | Teruyama | H04L 69/08 455/41.1 |
| 2011/0226853 A1* | 9/2011 | Soh | G06K 7/10237 235/380 |
| 2012/0123945 A1* | 5/2012 | Charrat | G06Q 20/351 705/26.1 |
| 2012/0135693 A1* | 5/2012 | Teruyama | H04W 4/80 455/68 |
| 2012/0309302 A1* | 12/2012 | Buhot | G06K 7/10237 455/41.1 |
| 2013/0217325 A1* | 8/2013 | Ingels | H04B 5/0031 455/41.1 |
| 2013/0303086 A1* | 11/2013 | Chene | G06K 7/10297 455/41.1 |
| 2014/0227973 A1* | 8/2014 | Van Nieuwenhuyze | H04B 5/02 455/41.1 |
| 2015/0033289 A1* | 1/2015 | Caceres | H04W 12/088 726/3 |
| 2015/0263787 A1* | 9/2015 | Gimeno Monge | G06Q 20/3226 455/41.1 |
| 2015/0287009 A1* | 10/2015 | Crowley | G06F 9/485 705/16 |
| 2016/0086159 A1* | 3/2016 | Golla | G06Q 20/3226 705/76 |
| 2016/0112159 A1* | 4/2016 | Banthia | G06F 11/0793 714/748 |
| 2016/0132875 A1* | 5/2016 | Blanco | G06Q 20/047 705/44 |
| 2016/0261409 A1* | 9/2016 | French | H04L 9/3234 |
| 2016/0360352 A1* | 12/2016 | Khan | H04W 4/80 |
| 2017/0188262 A1* | 6/2017 | Roehrle | H04W 74/085 |
| 2017/0303077 A1* | 10/2017 | Li | H04B 5/0031 |
| 2017/0357329 A1* | 12/2017 | Park | G06F 1/3215 |
| 2019/0205863 A1* | 7/2019 | Shin | G06Q 20/3278 |
| 2020/0286061 A1* | 9/2020 | Wang | G06Q 20/4014 |
| 2021/0195415 A1* | 6/2021 | Yang | H04W 12/63 |

* cited by examiner

FAST NFC PROCESSING

CROSS-REFERENCE TO RELATED APPLICATIONS

This application is a national stage filing under Section 371 of PCT/EP2019/082999, filed Nov. 28, 2019, which claims priority to French Patent Application No. 1872151, filed on Nov. 30, 2018, which applications are hereby incorporated herein by reference.

TECHNICAL FIELD

The present disclosure relates generally to an electronic system and method, and, in particular embodiments, to fast near field communication (NFC) processing.

BACKGROUND

Mobile telephones and other types of mobile devices such as wearables, including smart watches, are increasingly being equipped with NFC (Near Field Communications) interfaces, which enable them to perform electromagnetic transponder functions over relatively short distances in addition to their other functions. In particular, such devices are able to emulate the functions of an electromagnetic transponder, which could be of the contactless card type, or the contactless reader type. Such functionality, for example, enhances the mobile device, by allowing it to be used for various applications, for example, as an electronic wallet allowing payments to be made, and/or by transport applications for accessing services such as transport networks.

To emulate the operation of a contactless card, the mobile device is generally equipped with a contactless front end integrated circuit (CLF), also called an NFC controller. This circuit comprises a radio frequency (RF) transceiver front-end coupled to a low-range antenna to match the communication capabilities of an electromagnetic transponder. In some applications, a secure element (SE) can be used to provide authentication.

SUMMARY

There is a general desire to reduce the transaction processing time for NFC transactions. However, particularly in the case of card emulation, there are technical difficulties in reducing the transaction processing time. Embodiments provide a solution addressing this technical problem.

Some embodiments relate to a method and device for NFC.

Some embodiments reduce the transaction processing time for NFC transactions in the case of card emulation.

According to one embodiment, an NFC controller of an NFC device is configured to transmit, after the detection, by the NFC controller, of an NFC reader in relation with a first NFC transaction and prior to receiving an application selection command from the NFC reader, an application selection message to a transaction handling element of the NFC device.

According to one embodiment, the NFC controller further includes a buffer storing an indication of a previous application selected by a previous application selection command, where the application selection message designates the previous application.

According to one embodiment, the previous application is selected in relation with a first type of RF communication; and the buffer is configured to store the indication of the previous application in relation with the first type of RF communication and to further store an identifier of a further previous application selected by a previous application selection command in relation with a second type of RF communication.

According to one embodiment, the NFC controller further includes a counter configured to count a number of times the NFC controller previously received an application selection command designating the previous application, where the NFC controller is configured to verify that the counter has reached a count value of at least N prior to transmitting the application selection message in relation with the first NFC transaction, where N is an integer equal to 1 or more.

According to one embodiment, the transaction handling element is a secure element.

According to one embodiment, the detection of the NFC reader comprises the reception by the NFC device of a field on command or of a polling command from the NFC reader.

According to one embodiment, the RF communication is of type A or B, and the application selection message is transmitted after transmitting a card activated message to the transaction handling element.

According to one embodiment, the RF communication is of type F, and the application selection message is transmitted during an anti-collision process or directly following field detection.

According to one embodiment, the NFC controller is further configured to transmit, after transmitting the application selection message and prior to receiving the application selection command, a further command to the transaction handling element.

According to one embodiment, the NFC controller is further configured to receive the application selection command from the NFC controller; and to determine whether the application selection command designates a different application from the one designated by the application selection message, and if so to perform application deselection, and then to transmit a new application selection message selecting the application designated by the application selection command.

According to one embodiment, the NFC controller is configured to perform the application deselection by transmitting a card deactivated message to the transaction handling element.

According to one embodiment, the NFC controller is configured to perform the application deselection by transmitting a field off message, a field on message, and a card activated message to the transaction handling element.

According to an embodiment, a method of NFC transaction processing includes: transmitting, by an NFC controller of an NFC device after the detection by the NFC controller of an NFC reader in relation with a first NFC transaction and prior to receiving an application selection command from the NFC reader, an application selection message to a transaction handling element of the NFC device.

According to one embodiment, the method further includes storing by the NFC controller in a buffer an indication of a previous application selected by a previous application selection command, the application selection message designating the previous application.

According to one embodiment, the identifier of the previous application selected by the previous application selection command is stored in association with a first type of RF communication, the method further comprising storing by the NFC controller in the buffer, in association with a second type of RF communication, a further indication of a further previous application selected by a previous application selection command.

According to one embodiment, the method further includes counting, using a counter of the NFC controller, a number of times the NFC controller previously received an application selection command designating the previous application, wherein the NFC controller is configured to verify that the counter has reached a count value of at least N prior to transmitting the application selection message in relation with the first NFC transaction, where N is an integer equal to 1 or more.

According to one embodiment, the method further includes receiving the application selection command from the NFC controller, and if the application selection command designates a different application from the one designated by the application selection message, the method further includes performing, by the NFC controller, application deselection; and transmitting a new application selection message to the transaction handling element.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the particular implementation of an NFC controller has not been described in detail, such implementations being within the competence of those skilled in the art.

Unless indicated otherwise, when reference is made to two elements connected together, this signifies a direct connection without any intermediate elements other than conductors, and when reference is made to two elements linked or coupled together, this signifies that these two elements can be connected or they can be linked or coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures, or to an NFC device as orientated during normal use.

Unless specified otherwise, the expressions "around," "approximately," "substantially," and "in the order of," signify within 10%, and preferably within 5%.

Figure 1:
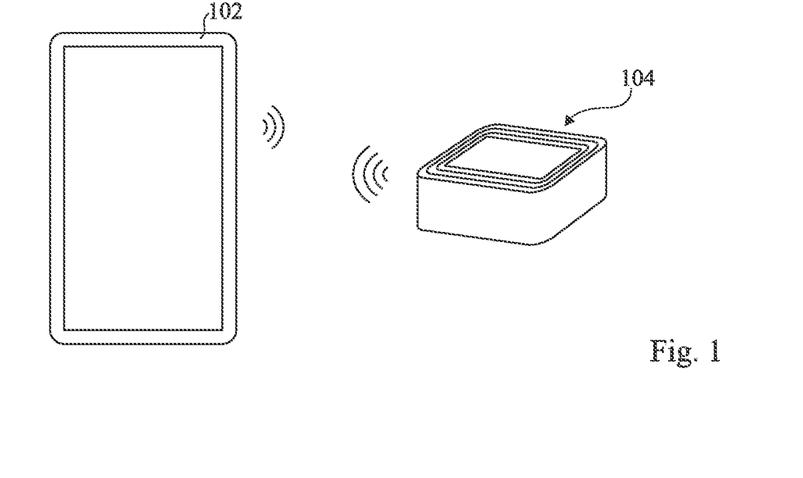
FIG. 1 schematically illustrates an NFC device capable of near field communications, according to an example embodiment of the present disclosure.

FIG. 1 schematically illustrates an NFC device 102, capable of NFC communications. For example, the device 102 is a mobile communications device, such as a mobile telephone, smartphone, smart watch, tablet computer, digital media player or the like, equipped with NFC circuitry.

The NFC device 102 of FIG. 1 is shown in a communication with a reader 104, comprising an NFC transponder. For example, the reader 104 is positioned at an entry barrier of a restricted area such as at the entrance to a transport network or the like. When used with such a reader, the NFC circuit of the NFC device 102, for example, operates in a tag emulation mode.

Figure 2:
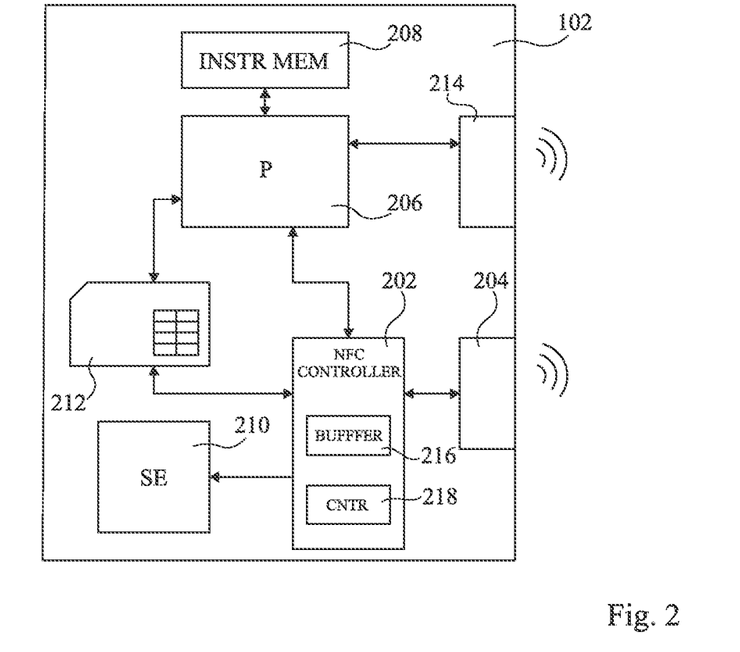
FIG. 2 schematically illustrates the NFC device of FIG. 1 in more detail, according to an example embodiment of the present disclosure.

FIG. 2 schematically illustrates the NFC device 102 in more detail according to an example embodiment.

As illustrated, the device 102, for example, comprises an NFC controller (NFC CONTROLLER) 202, also known in the art as a contactless front-end (CLF). The NFC controller 202 is coupled to an NFC antenna circuit 204. Together, the controller 202 and the antenna circuit 204 provide an NFC circuit for emulating the behavior of an NFC transponder. The functions of the NFC controller 202 are, for example, implemented in hardware and in some cases at least partially by software executed by a suitable processing device.

The NFC controller 202 is also, for example, coupled to a host processing device (P) 206 of the NFC device 102. The processing device 206, for example, comprises one or more processors under the control of instructions stored in an instruction memory (INSTR MEM) 208. Memory 208 is, for example, a Flash memory, and stores one or more applications that have been loaded onto the device. The NFC controller 202 is also, for example, coupled to other devices, including one or more secure elements. Each secure element may have one of several form factors, and in particular may be, for example, a universal integrated circuit card (UICC), an eUICC (embedded UICC), an embedded secure element (eSE) integrated in the mobile device or contained in a micro-circuit of the subscriber identification module (SIM), a universal SIM (USIM) or a micro secure digital (μSD). In the example of FIG. 2, a secure element (SE) 210 and USIM circuit 212 are illustrated. The USIM circuit 212 is, for example, coupled to the NFC controller 202 via a single wire protocol (SWP) link, and is additionally coupled to the host processing device 206.

The host processing device 206 is also, for example, coupled to one or more antenna circuits 214, which, for example, permit telecommunications within a cellular network, and/or wireless communications according to other standards such as Wi-Fi, Bluetooth, etc.

The NFC controller 202, for example, comprises a buffer (BUFFER) 216 implemented by one or more registers or by a non-volatile memory, such as a FLASH memory.

The NFC controller 202 also, for example, comprises a counter (CNTR) 218, which is, for example, an M-bit counter, where M is equal to at least 2.

Operation of the NFC controller 202, including the buffer 216 and counter 218, will be described in more detail below.

Figure 3:
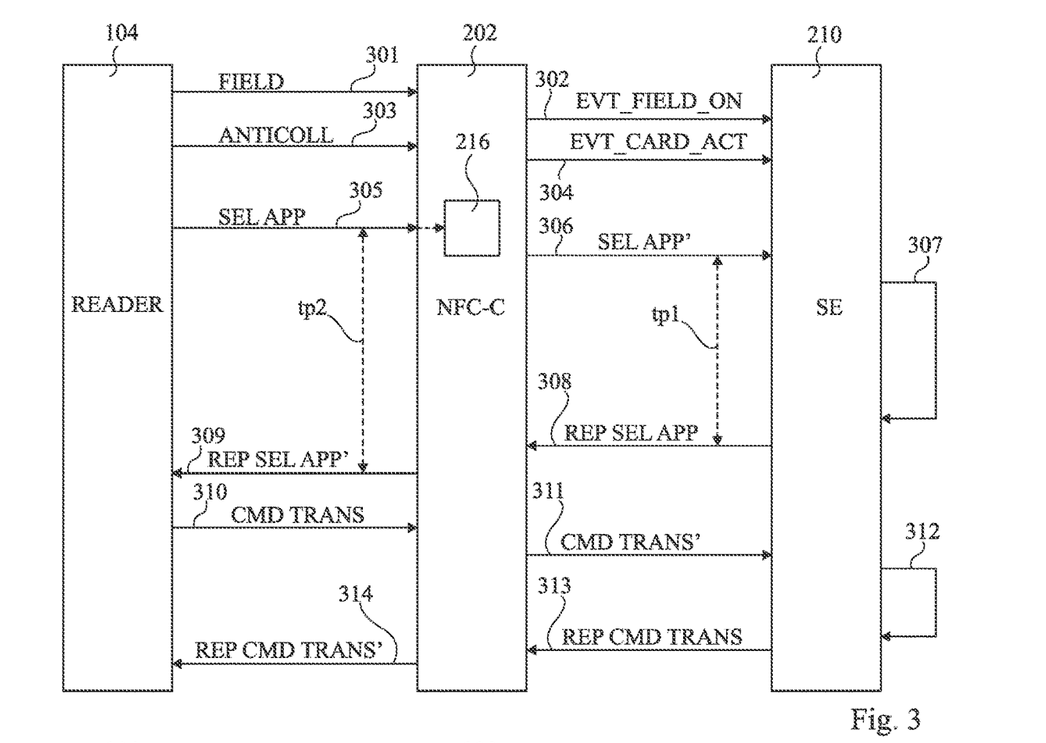
FIG. 3 illustrates a communications sequence between a card reader, an NFC controller and a secure element, according to an example embodiment of the present disclosure.

FIG. 3 illustrates an example of a communications sequence between the card reader (READER) 104, the NFC controller (NFC-C) 202 and the secure element (SE) 210. While FIG. 3 represents the particular case in which the NFC transaction is handled by the secure element 210, it will be apparent to those skilled in the art that the NFC transaction could also be handled by another type of device such as an eSE, integrated SE (iSE), USIM 212, integrated SIM (iSIM), eUICC, etc. More generally, any NFC transaction handling element that is capable of running an application for processing the NFC transaction could be used. For example, in some cases, this transaction handling element could correspond to the host processor 206 of the NFC device, which may comprise a Central Processing Unit (CPU), and is, for example, capable of hosting an application for performing NFC transactions. In some cases, the application could also be hosted in an isolated environment of the host processor, such as a Trusted Execution Environment (TEE), depending on the nature of the transaction and the level of security to be applied.

An NFC transaction starts when the NFC controller 202 detects the field presence 301 from the NFC reader 104. This detection is, for example, the result of the NFC controller 202 detecting, via the antenna 204, a field command (FIELD) 301 from the reader 104.

The detection of the field, for example, triggers the transmission by the NFC controller 202 of a field on message (EVT_FIELD_ON) to the secure element 210 indicating that this event has occurred, as represented by an arrow 302. This message, for example, informs the host that the field has been detected and that an NFC transaction is being initiated. For example, in the case that the host system is in a sleep mode, this message is, for example, used to wake-up the system.

The NFC reader 104 then, for example, wirelessly transmits over the NFC interface the anti-collision commands (ANTICOLL) 303, which are received by the NFC controller 202. The anti-collision commands, for example, include all commands used during the anti-collision process for whichever RF communication type is being applied, including, for example, the polling command. In the case of type A or B, the NFC controller 202, for example, sends a card activated message (EVT_CARD_ACT) to the secure element 210, as represented by an arrow 304, to inform the SE 210 that transaction content will start. It also, for example, informs the SE 210 of the communication type of RF transaction that will be used. In some embodiments, in accordance with the standard ETSI TS 102 622, the contents of which are hereby incorporated by reference, the messages between the NFC controller 202 and each host, such as the SE 210, are performed via a pipe supporting the associated RF communication type, e.g. Card Gate type A, Card gate type B or Card gate type F.

The NFC reader 104 then, for example, wirelessly transmits, over the NFC interface, an application selection command (SEL APP) 305. The application selection command 305 is, for example, a command designating, explicitly or implicitly, the application to be used by the transaction handling element, for example, by the secure element 210. In other words, based on the application selection command 305, the NFC controller 202 or the secure element 202 is, for example, capable of deducing the application to be selected.

For example, in some embodiments, the application selection command contains an application identifier of the application to be selected. For example, the application selection command could be a SELECT command as defined in ISO7816. For example, in some embodiments, this is a command destined for a proximity payment system environment (PPSE) emulated by the secure element 210, and, for example, designates a certain application. Alternatively, according to the application implementation and the RF protocol, a type of command different to the SELECT command of ISO7816 could trigger the application selection.

According to other embodiments, the application selection command 305 is a command containing data based on which the application to be selected for use by the secure element can be implicitly deduced. For example, the application selection command contains a certain bit pattern that implies that a certain application, such as a default application, should be selected.

As represented by a dashed arrow in FIG. 3, in some embodiments, the application selection command, or more generally an indication of the application designated by the application selection command, is stored to the buffer 216, as will be described in more detail below.

In the case that the application selection command contains an identifier of the application to be selected, this command is, for example, forwarded in an application selection message (SEL APP') 306 from the NFC controller 202 to the secure element 210.

Alternatively, the application selection command does not contain the identifier of the application to be selected, but the application can be deduced based on the application selection command. In this case, in some embodiments, the application selection command is forwarded in the application selection message (SEL APP') 306 from the NFC controller 202 to the secure element 210 so that the secure element 210 can deduce the application to be selected. In other embodiments, the NFC controller 202 is configured to deduce the application to be selected based on the application selection command, and to generate the application selection message (SEL APP') 306 to include an identifier of the deduced application to be selected.

Upon reception of the application selection message 306, the secure element 210, for example, loads and configures the selected application, as represented by an arrow 307 in FIG. 3. For example, if the application selection message 306 includes an application identifier, the application is identified directly by the secure element 210. Alternatively, if the application selection message 306 does not include an application identifier, the application is, for example, deduced by the secure element 210, for example, based on a detected bit pattern. In some cases, loading and configuring the selected application involves initialization of a virtual machine by the secure element, which in some embodiments is a Java code virtual machine (JCVM), and the loading of a stored context in relation with the virtual machine. Once these application initialization operations have been completed, the selected application is running at the secure element 210 and, for example, generates and transmits to the NFC controller 202 a response message (REP SEL APP) 308.

The NFC controller 202, for example, forwards the response message 308 to the card reader 104 in the form of a wireless transmission (REP SEL APP') 309 via the NFC antenna circuit 204.

The reader 104, for example, then wirelessly transmits to the NFC controller 202 a transaction command (CMD TRANS) 310, which is forwarded by the NFC controller 202 to the secure element 210 in a transaction command message (CMD TRANS') 311.

The selected application running at the secure element 210 then processes the transaction command, as represented by an arrow 312, and provides a command response message (REP CMD TRANS) 313 to the NFC controller 202. The NFC controller 202 forwards this message to the reader 104 as a wireless transmission (REP CMD TRANS') 314 over the NFC interface, which for example completes the NFC transaction.

It will be noted that the time delay tp1 between the reception of the application selection message SEL APP' 306 by the secure element 210, and the response REP SEL APP transmitted by the selected application running on the secure element 210, can be relatively long with respect to the overall transaction time. This in turn leads to a relatively long time delay tp2 between the reception by the NFC controller 202 of the application selection command SEL APP 305, and the transmission by the NFC controller 202 of the response REP SEL APP' 309 to the reader 104. In some embodiments, it would be desirable to reduce to some extent the time delay in handling the NFC transaction.

Figure 4:
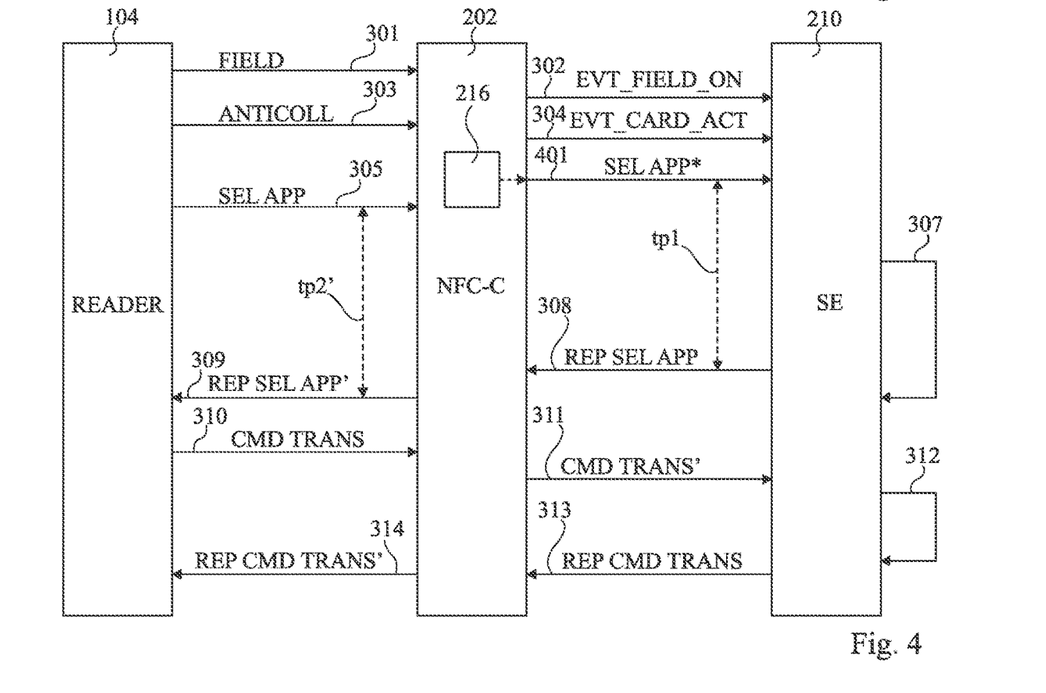
FIG. 4 illustrates a communications sequence between a card reader, an NFC controller and a secure element, according to an example embodiment of the present disclosure.

FIG. 4 illustrates a communications sequence between the card reader 104, the NFC controller 202 and the secure element 210, according to an embodiment of the present disclosure. Many of the operations represented in FIG. 4 are the same as those of FIG. 3, and these operations are labelled with like reference numerals and will not be described again in detail.

A difference in the sequence of FIG. 4 is that, rather than transmitting the message SEL APP' 306, the NFC controller 202 is, for example, configured to transmit an application selection message SEL APP* 401 prior to receiving the application selection command SEL APP 305 from the reader 104. For example, the message SEL APP* is transmitted to the secure element 210 at a time that is earlier than the time the application selection command SEL APP 305 is received by the NFC controller 202 from the reader 104.

In some embodiments, the application selection message SEL APP* is transmitted to the secure element 210 directly after the card activated message EVT_CARD_ACT 304. The application selection message SEL APP*, for example, selects an application designated by a previous application selection command SEL APP from the reader 104. For example, as indicated above in relation with FIG. 3, an indication of the application designated by the previous command, or the previous command itself, has been stored to the buffer 216. In the following, it will be assumed that the command itself is stored to the buffer 216, but in alternative embodiments the information could be encoded in another manner. The command is, for example, retrieved by the NFC controller 202 from the buffer 216, and transmitted to the secure element 210.

In response to the application selection message SEL APP*, the secure element 210, for example, performs the same initialization operations 307 as described above in relation with FIG. 3. This may involve deducing the application to be selected based on the application selection message. Once complete, the selected application running at the secure element 210 transmits the response message REP SEL APP 308 to the NFC controller 202. The NFC controller 202 wirelessly forwards the message in the transmission REP SEL APP' 309 to the reader 104.

Advantageously, the time delay tp2' between the reception by the NFC controller 202 of the application selection command SEL APP 305 and the transmission by the NFC controller 202 of the response REP SEL APP' is thus reduced with respect to the time delay tp2, in view of early transmission of the application selection message SEL APP*. In some embodiments, this permits the transaction delay to be reduced by between 5 and 10 ms or more.

Operation of the NFC controller 202 will now be described in more detail with reference to FIGS. 5 and 6.

Figure 5:
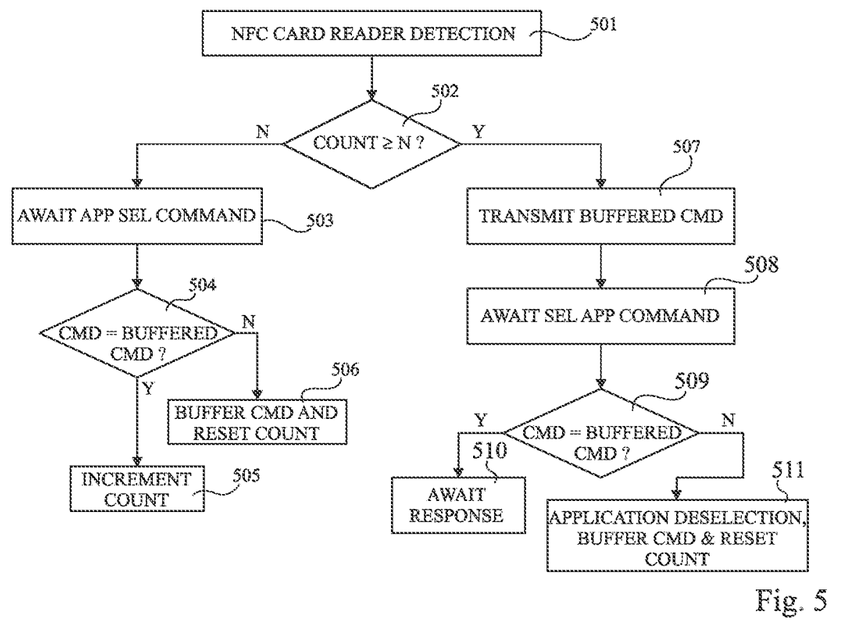
FIG. 5 is a flow diagram representing operations in a method of performing an NFC transaction, according to an example embodiment of the present disclosure.

FIG. 5 is a flow diagram representing operations of the NFC controller 202, according to an embodiment.

In an operation 501, the NFC controller 202 detects the presence of the NFC card reader 104, as described above.

In an operation 502, the NFC controller 202, for example, determines whether the counter 218 has reached or exceeded a count value N. For example, in some embodiments, the NFC controller 202 is configured to only send the application selection message prior to the reception of the application selection command if a same application selection command has been received N times successively. If the count value is less than N, in an operation 503, NFC controller 202 is configured to wait for the application selection command. Then, in an operation 504, the NFC controller 202 is, for example, configured to compare the received command with the buffered command, and if they match, the count value COUNT is incremented in an operation 505. Alternatively, if the received command is different from the buffered command, or if the buffer is empty, in an operation 506 the received command is, for example, stored to the buffer, and the counter value COUNT is, for example, reset to 1.

After operations 505 and 506, the NFC controller 202, for example, proceeds in the manner of FIG. 3 by sending the application selection message SEL APP' with normal timing. If, however, in operation 502 the count value is found to be equal or greater than N, in an operation 507, the buffered command is forwarded in the message 401 to the secure element. In some embodiments, in the case of type A and B NFC transactions, this message is transmitted to the secure element 210 once the anti-collision command has been received from the card reader 104 and the card activated message EVT_CARD_ACT has been sent to the secure element 210. In the case of a type F NFC transaction, the message 401 is, for example, transmitted to the secure element 210 during the anti-collision process or directly following field detection. Furthermore, in some embodiments, in the case of type F communications, the NFC controller may also store in the buffer 216 and transmit to the SE 210, after transmitting the application selection message 401 and prior to receiving the application selection command 305, a further command such as a CUP (Check Command, Update Command or Proprietary Command) to the transaction handling element 210. The CUP command provides additional information that can permit the SE 210 to perform additional processes in advance, thereby further reducing the NFC transaction time in the case of type F.

In an operation 508, the NFC controller 202 then waits for the application selection command SEL APP from the reader 104.

Once the NFC controller 104 receives the application selection command, in an operation 509, the NFC controller 202 is, for example, configured to compare the received command with the buffered command, or in some cases to compare the application explicitly or implicitly designated by the received command with the application identified in the buffer. If they match, in an operation 510, the NFC controller 202 awaits the response message from the secure element 210. Alternatively, if the received command is different from the buffered command, or in some cases if the application designated by the received command is different from the application identified in the buffer, application deselection is, for example, performed in an operation 511, the received command is buffered, and the counter value COUNT is, for example, reset. Application deselection will be described in more detail with reference to FIG. 6.

After the operations 505, 506 or 511, the message SEL APP' is, for example, sent to the SE 210 based on the received command SEL APP, and the NFC controller 202 waits for the answer.

Figure 6:
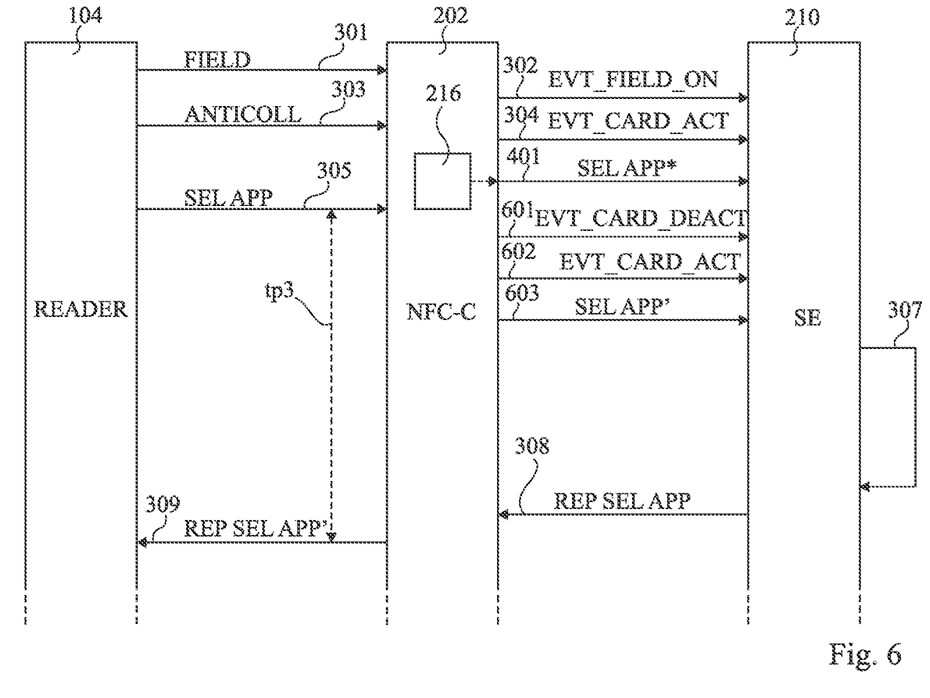
FIG. 6 illustrates a communications sequence between a card reader, an NFC controller and a secure element, according to an example embodiment of the present disclosure.

FIG. 6 illustrates a communications sequence between the card reader 104, the NFC controller 202 and the secure element 210 according to yet a further embodiment, and in particular corresponds to a case in which the application selection command SEL APP 305 designates a different application to the one designated by the buffered command and by the message 401.

In such a case, after receiving the application selection command 305, the NFC controller 202, for example, performs application deselection by transmitting to the secure element 210 a card deactivated message (EVT_CARD_DEACT) 601, followed by a new card activated message (EVT_CARD_ACT) 602, and then by a new application selection message (SEL APP') 603. Thus the secure element 210 is controlled to interrupt previous initialization operations in relation with the application selected by the message SEL APP* 401, and to start the new initialization 307 based on the application designated by the application selection command SEL APP 305. Processing of the NFC transaction then proceeds in a similar manner to that of FIGS. 3 and 4, not all of the operations being represented in FIG. 6.

The time delay tp3 between the reception of the application selection command SEL APP 305 by the NFC controller 202 and the transmission of the response message REP SEL APP' 309 to the reader 104 is, for example, slightly longer than the period tp2 of FIG. 3. However, the present inventors have found that there is a relatively high probability of a previously selected application being reselected, and therefore, on average, there is a significant reduction in the NFC transaction time.

An advantage of the embodiments described herein is that the transaction processing time of an NFC transaction can be reduced. This is due in part to the transmission of an application selection message prior to the reception of an application selection command, and in part to the provision of the NFC controller and the transaction handling element as separate elements, which are thus capable of operating in parallel. Indeed, this permits the transaction handling element to begin the operations involved in loading and configuring the selected application while the NFC controller is handling communications with the card reader.

Various embodiments and variants have been described. Those skilled in the art will understand that certain features of these embodiments can be combined and other variants will readily occur to those skilled in the art. For example, while FIG. 6 illustrates an example in which application deselection is performed by transmitting a card deactivated message, in alternative embodiments, other processes could be used. For example, a field off message EVT_FIELD_OFF could be transmitted, followed by a new field on message EVT_FIELD_ON, and then a new card activated message EVT_CARD_ACT. In yet further embodiments the secure element could be configured to recognize a dedicated message that deselects the previously selected application.

Furthermore, while in some embodiments described above all types of RF communications of the NFC transactions, and in particular type A, type B and type F (FeliCa), are processed in a similar fashion, in alternative embodiments, a distinction is made between the transaction types. For example, the buffer 216 is configured to store a previous command associated with each RF communication type, for example a command associated with type A, another associated with type B and/or another associated with type F. The NFC controller 202 is then, for example, configured to detect the type of RF communication for each new NFC transaction, and to select the corresponding buffered command. A counter 218 could also be provided in the NFC controller 202 for each RF communication type, such that the buffered command is sent to the secure element only after receiving the same command N times successively for the corresponding RF communication type.

The invention claimed is:

1. A near field communications (NFC) controller of an NFC device, the NFC controller configured to:
   detect an NFC reader in relation with a first NFC transaction; and
   after the detection and before receiving an application selection command from the NFC reader, transmit an application selection message to a transaction handling element of the NFC device.

2. The NFC controller of claim 1, comprising a buffer configured to store a previous application selection command or an indication of a previous application selected based on the previous application selection command, wherein the application selection message comprises the previous application selection command or designates the previous application.

3. The NFC controller of claim 2, wherein:
   the previous application selection command relates to a first type of RF communication; and
   the buffer is configured to store the previous application selection command or the indication of the previous application, in relation with the first type of RF communication, and to further store a further previous application selection command or an indication of a further previous application selected based on a previous application selection command, in relation with a second type of RF communication.

4. The NFC controller of claim 1, further comprising a counter configured to count a number of times the NFC controller previously received the application selection command causing a previous application to be designated, wherein the NFC controller is configured to verify that the counter has reached a count value of at least N before prior to transmitting the application selection message in relation with the first NFC transaction, wherein N is an integer higher than or equal to 1.

5. The NFC controller of claim 1, wherein the transaction handling element is a secure element.

6. The NFC controller of claim 1, wherein the NFC controller configured to detect the NFC reader by detecting a reception, by the NFC device, of a field on command or of a polling command from the NFC reader.

7. The NFC controller of claim 1, wherein an RF communication between the NFC reader and the NFC device is of type A or B, and wherein the application selection message is transmitted after transmitting a card activated message to the transaction handling element.

8. The NFC controller of claim 1, wherein an RF communication between the NFC reader and the NFC device is of type F, and wherein the application selection message is transmitted during an anti-collision process or directly following the detection of the NFC reader.

9. The NFC controller of claim 8, further configured to transmit, after transmitting the application selection message and before receiving the application selection command, a further command to the transaction handling element.

10. The NFC controller of claim 1, further configured to receive the application selection command from the NFC reader, wherein the application selection command indicates an application to be selected or permits the transaction handling element or the NFC controller to deduce the application to be selected.

11. The NFC controller of claim 10, further configured to:
determine whether the application selection command designates a different application from the one designated by the application selection message; and
when the application selection command designates a different application from the one designated by the application selection message:
perform application deselection, and
transmit a new application selection message selecting an application designated by the application selection command.

12. The NFC controller of claim 11, wherein the NFC controller is configured to perform the application deselection by transmitting a card deactivated message to the transaction handling element.

13. The NFC controller of claim 11, wherein the NFC controller is configured to perform the application deselection by transmitting a field off message, a field on message, and a card activated message to the transaction handling element.

14. A method of near field communication (NFC) transaction processing, the method comprising:
detecting, by an NFC controller of an NFC device, an NFC reader in relation with a first NFC transaction; and
after detecting the NFC reader and before receiving an application selection command from the NFC reader, transmitting, by the NFC controller, an application selection message to a transaction handling element of the NFC device.

15. The method of claim 14, further comprising storing in a buffer of the NFC controller a previous application selection command or an indication of a previous application selected based on the previous application selection command, wherein the application selection message comprises the previous application selection command or designates the previous application.

16. The method of claim 15, wherein the previous application selection command or the indication of the previous application selected based on the previous application selection command, is stored in association with a first type of RF communication, the method further comprising storing in the buffer, in association with a second type of RF communication, a further previous application selection command or an indication of a further previous application selected based on the further previous application selection command.

17. The method of claim 14, further comprising:
counting, using a counter of the NFC controller, a number of times the NFC controller previously received the application selection command causing a previous application to be designated; and
verifying that the counter has reached a count value of at least N before transmitting the application selection message in relation with the first NFC transaction, wherein N is an integer higher than or equal to 1.

18. The method of claim 14, further comprising receiving the application selection command from the NFC reader, wherein the application selection command indicates an application to be selected or permits the transaction handling element or the NFC controller to deduce the application to be selected.

19. The method of claim 18, further comprising:
when the application selection command designates a different application from the one designated by the application selection message,
performing, by the NFC controller, application deselection, and
transmitting a new application selection message to the transaction handling element.

20. A near field communication (NFC) device comprising:
an antenna;
a secure element; and
an NFC controller configured to:
detect an NFC reader in relation with a first NFC transaction using the antenna,
after the detection and before receiving an application selection command from the NFC reader, transmit an application selection message to the secure element.

21. The NFC device of claim 20, wherein the NFC controller comprises a buffer configured to store a previous application selection command or an indication of a previous application selected based on the previous application selection command, wherein the application selection message comprises the previous application selection command or designates the previous application.

22. The NFC device of claim 21, wherein the NFC controller comprises a counter configured to count a number of times the NFC controller previously received the application selection command causing the previous application to be designated, wherein the NFC controller is configured to verify that the counter has reached a count value of at least N before transmitting the application selection message in relation with the first NFC transaction, wherein N is an integer higher than or equal to 1.

* * * * *

UNITED STATES PATENT AND TRADEMARK OFFICE
CERTIFICATE OF CORRECTION

PATENT NO. : 11,652,512 B2
APPLICATION NO. : 17/294978
DATED : May 16, 2023
INVENTOR(S) : Olivier Van Nieuwenhuyze It is certified that error appears in the above-identified patent and that said Letters Patent is hereby corrected as shown below:

In the Claims

Claim 4, Column 10, Lines 44-45; delete "prior to".

Signed and Sealed this
Thirteenth Day of June, 2023

Katherine Kelly Vidal
*Director of the United States Patent and Trademark Office*